Feb. 27, 1951  A. G. BROWN  2,543,351
REFRIGERATING APPARATUS
Filed March 10, 1947
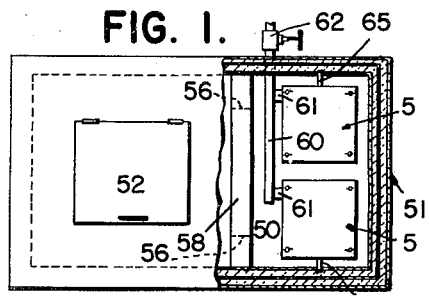
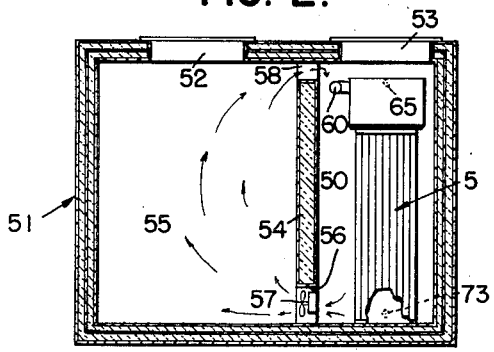
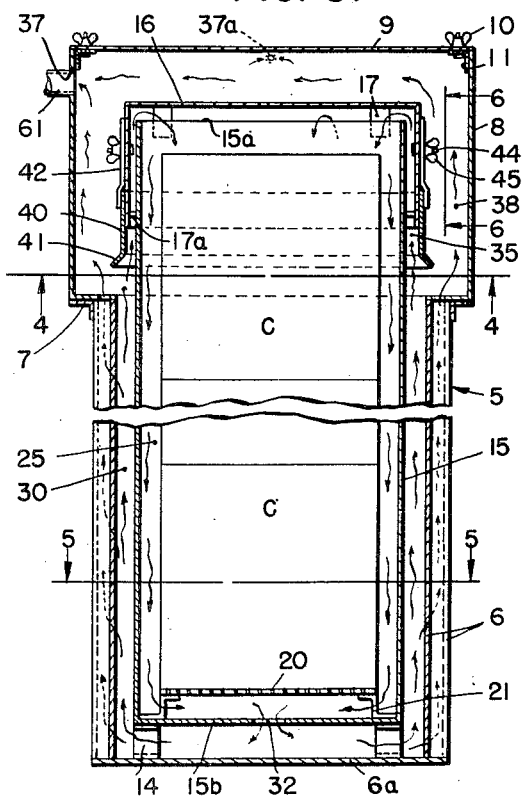
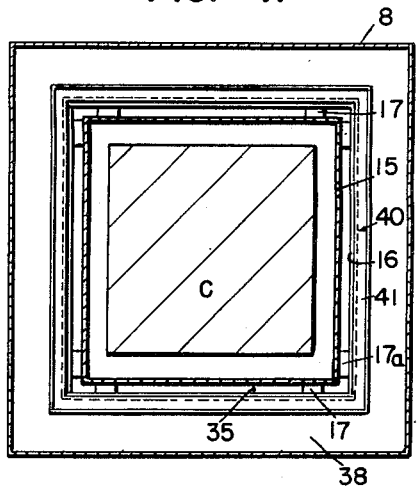
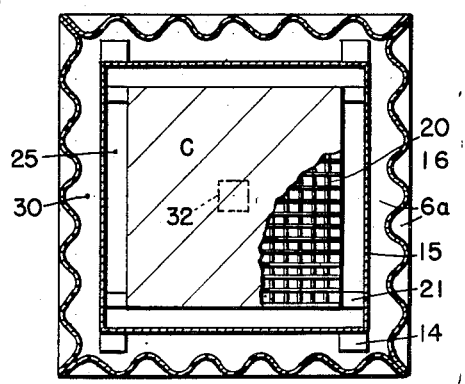
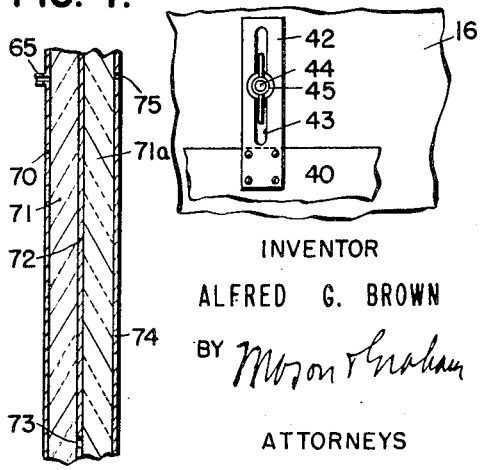
INVENTOR
ALFRED G. BROWN
BY
ATTORNEYS Patented Feb. 27, 1951

2,543,351

UNITED STATES PATENT OFFICE 2,543,351

REFRIGERATING APPARATUS

Alfred G. Brown, Los Angeles, Calif.

Application March 10, 1947, Serial No. 733,487

7 Claims. (Cl. 62—91.5)

1

This invention has to do with apparatus for effecting refrigeration by novel control and direction of expansible gases in relation to heat transfer surfaces and involves improvements in the apparatus illustrated in my copending applications Serial No. 482,400, filed April 9, 1943, now patent No. 2,512,916, and Serial No. 716,317, filed December 14, 1946, now Patent No. 2,523,530, of which this application is a continuation-in-part.

More particularly my invention relates to the control and direction of $CO_2$ gas, it being an object of the present invention to provide in apparatus of the type shown in my said copending applications novel means for effecting more accurate control of the gases.

Another object of the present invention is to provide a novel means for adjusting certain gas directing elements of the apparatus.

Another object is to provide novel apparatus by which more effective control of the gas and refrigerating temperatures may be accomplished.

Other objects will appear hereinafter.

By way of making my invention clearly understood I shall now describe one of its specific and presently preferred embodiments, although I wish it understood that within the broader scope of the invention as defined by the appended claims the details of construction and arrangement are susceptible of variation and modification.

In the accompanying drawings illustrative of the embodiment of the invention now to be described.

Fig. 1 is a partly in plan and partly in horizontal section showing a refrigerating cabinet utilizing my invention;

Fig. 2 is a vertical section of the device of Fig. 1;

Fig. 3 is an enlarged vertical section of one of the refrigerating units shown in Figs. 1 and 2;

Figs. 4 and 5 are sections taken, respectively, on lines 4—4 and 5—5 of Fig. 3;

Fig. 6 is an enlarged detail, in elevation, taken as viewed from line 6—6 of Fig. 3; and Fig. 7 is an enlarged fragmentary section of a wall of a refrigerating cabinet.

While it is well known that $CO_2$ is capable of expanding to many hundred times its compressed volume—that is, from its storage state as Dry Ice—so far as I am aware no one has obtained the phenomenal efficiency in refrigerating by the use of Dry Ice that I have. I attribute this efficiency, among other things, to the novel means for and method of control which I provide for the gases while passing from the compressed stage to the stage of final expansion. By my arrangement I cause those gases to pass through a plurality of cycles of expansion and contraction which I have chosen to designate as "multiple expansion."

Referring first to Fig. 3 of the drawings, I there illustrate in section one of the refrigerating units 5, any desired number of which may be utilized in a given refrigerating assembly, and it will be understood that where I later describe the use of a plurality of these units each will be of the construction shown in Fig. 3.

The unit 5 consists of an outer casing 6 whose side walls are corrugated so as to present a maximum heat exchange surface. This outer casing has a bottom wall 6a forming a closure or seal for the bottom end of the unit. The top end of the casing 6 is closed by means of a hood 8 mounted on the outer casing, as by means of angle iron brackets 7. The otherwise open top end of the hood is sealed by a cover plate 9 secured in position by bolt and wing nut assemblies 10, the bolts of which pass through the plate 9 and thence through holes in brackets 11 affixed to the inside of the hood.

An inner casing 15, which serves as a container for the Dry Ice blocks C, is mounted in the outer casing, the top end 15a of the inner casing being open and the bottom wall 15b of the inner casing being supported in spaced relationship to the bottom wall 6a of the outer casing by means of spacers 14.

An inner hood 16 is mounted in spaced relationship to and overhangs the open top end of the inner casing, being retained in such spaced relationship by means of brackets 17, 17a.

In the bottom of the inner casing I mount a foraminated shelf 20, the shelf being supported in spaced relationship to the bottom wall 15b by means of angle iron brackets 21. The Dry Ice blocks are supported directly on this shelf. The inner casing is preferably made large enough in cross-section in relation to the size of the Dry Ice blocks that the blocks are spaced from the side walls and provide a gas passageway 25 therebetween, which passageway is preferably about one and one-half inches wide.

The spacing between the side walls of the inner casing and the side walls of the outer casing provides a gas passageway 30 which is preferably approximately one and one-half inches wide at the inner border of the corrugations and three inches wide at the outer border of the corrugations. Passageways 25 and 30 communicate with each other at their bottoms through an opening 32 in the bottom wall of the inner casing, which opening I make approximately two inches square.

Hood 16 adjustably carries an auxiliary hood 40 which surrounds hood 16 and depends therefrom, and has a flared skirt 41 which has upstanding brackets 42 longitudinally slotted at 43 to pass bolts 44 threadedly carrying wing nuts 45. Thus the auxiliary hood is vertically adjustable relative to the hood 16 and has an outward flare in the skirt 40 which partially overhangs the top end of passageway 30 to somewhat direct gas moving upwardly in passageway 30 into the hood.

The outer hood 8 has a pair of outlet ports 37, 37a through which the finally expanded gas escapes after entering chamber 38 provided by the outer hood, as will be hereinafter described.

As the dry ice sublimates, the gas passes downwardly along passageway 25, out through opening 32 and thence upwardly along passageway 30, as indicated by the arrows in Fig. 3.

Of the gas passing upwardly along passageway 30 that which is in contact with and adjacent the corrugated heat exchange side wall of the outer casing becomes relatively more greatly expanded than that in contact with the wall of the inner casing, so that upon reaching the upper end of passageway 30 the relatively expanded gas which has passed upwardly along the wall of the outer casing will pass into the chamber 38 and thence outwardly through ports 37, 37a. However, the relatively compressed or cooled gas passing upwardly along passageway 30 along the wall of the inner casing will enter the passageway 35 formed between the inner hood 16 and the outer surface of the side wall of the inner casing, which passageway is relatively narrower than passageway 30, being preferably only about three-fourths inch wide, and will then pass over the top edge of the inner casing and downwardly again along passageway 25 to be recirculated.

The flared portion 41 of the adjustable auxiliary hood 40 preferably overhangs only the narrow portion of the passageway 30, which is that portion between the side wall of the inner casing and the inner border of the corrugations of the side walls of the outer casing, which allows those gases passing upwardly along the corrugated wall to enter the chamber 38. The relative quantities of gas recirculated and passed into chamber 38 may be regulated by adjusting the auxiliary hood up and down as will be apparent.

In Figs. 1 and 2 I show two of the units 5 mounted in a refrigerating unit compartment 50 of a cabinet 51 whose insulated walls provide a closed cabinet accessible at its top through trap doors 52, 53.

Separated from compartment 50 by a partition wall 54 there is a refrigerating chamber or compartment 55.

Adjacent its bottom edge the partition wall 54 has a pair of ducts 56 in each of which is mounted an electrically powered blower 57, of conventional construction, disposed to draw air from compartment 50 and force it into chamber 55. As the air in chamber 55 absorbs heat it passes back into compartment 50 through a transom 58 in the partition wall to again circulate around and be exposed to the heat exchange walls 6, 8 of the units 5 and then to be again circulated through compartment 55.

For finer control of the refrigeration I provide valve controlled means for withdrawing the finally expanded gas from the units 5, which means is shown in Figs. 1 and 2. Here I provide a header 60 which has branching conduits 61 communicating with the respective outlet openings 37 in the hoods 8. This header preferably extends through the side wall of the cabinet 51 where its outlet is controlled by a valve 62.

When it is desired to maintain a particularly low temperature in chamber 55, as for quick freezing operations, the valve 62 may be fully opened and, in some cases, I may even elect to employ a blower to force withdrawal of the expanded gas through the header 60. If higher temperatures are desired, the valve 62 may be partially closed to restrict the discharge of gas. In practice I prefer to make the discharge opening 57 approximately one and one-eighth inches in diameter. The auxiliary outlet hole 37a in hood 8 is relatively smaller, being approximately three-eighths inch in diameter.

I find that it improves the insulation by providing a conduit 65 for each unit 5, which passes through the inner wall 70 of the insulation and into the insulating filling 71 between the inner wall and the intermediate wall 72, adjacent the top of the inner wall. The intermediate wall 72 has openings 73 adjacent its bottom and the outer wall 74 has final discharge openings 75 adjacent its top, so that the gas from outlet 37a may pass downwardly through the insulation 71 along one side of the intermediate wall 72 and thence upwardly through the insulation 71a between the intermediate wall and the outer wall 74 before it finally passes out (see Fig. 7). Thus the relatively cool gas provides in effect a blanket between the relatively warm or expanded gas passing upwardly between walls 72, 75, which latter gas also provides a blanket between the outside and the first-mentioned blanket. This improved insulating characteristic also forms one of the objects of my invention.

I claim:

1. Refrigerating apparatus comprising a pair of casings disposed in nested relationship whereby to provide a first gas passageway therebetween, the innermost of the casings being open at its top and carrying in its bottom portion a horizontal shelf of smaller area than the cross-sectional area of said inner casing and spaced from the bottom wall of said inner casing, said shelf being adapted to support a block of solidified $CO_2$ of a cross-sectional area coextensive with its top surface whereby to provide a second gas passageway extending beneath said shelf and around said block, said innermost casing having a restricted outlet opening in its bottom portion providing communication between said passageways, a hood supported in position overhanging the open top end of the inner casing and with its sides in spaced relation to the side walls of the inner casing whereby to provide a third gas passageway therebetween communicating with the second passageway at the top end of the inner casing, said hood having a longitudinally extensible skirt overhanging at least a portion of the width of the first passageway whereby to direct gas from the first into the third passageway, and an outlet orifice in the top portion of the casing.

2. Refrigerating apparatus comprising a pair of casings disposed in nested relationship whereby to provide a first gas passageway therebetween, the innermost of the casings being open at its top and carrying in its bottom portion a horizontal shelf of smaller area than the cross-sectional area of said inner casing and spaced from the bottom wall of said inner casing, said shelf being adapted to support a block of solidified $CO_2$ of a cross-sectional area coextensive with its top surface whereby to provide a second gas passageway extending beneath said shelf and around said block, said innermost casing having a restricted outlet opening in its bottom portion providing communication between said passageways, a hood supported in position overhanging the open top end of the inner casing and with its sides in spaced relation to the side walls of the inner casing whereby to provide a third passageway therebetween communicating with the second passageway at the top end of the inner casing, said hood having a skirt overhanging only a portion of the width of the first passageway in spaced relationship to the top end thereof whereby to direct a portion of the gas from the first into the third passageway, and an outlet in the outer casing for release of the remainder of the gas passing from the first passageway.

3. Refrigerating apparatus comprising a pair of casings disposed in nested relationship whereby to provide a first gas passageway therebetween, the innermost of the casings being open at its top and carrying in its bottom portion a horizontal shelf of smaller area than the cross-sectional area of said inner casing and spaced from the bottom wall of said inner casing, said shelf being adapted to support a block of solidified $CO_2$ of a cross-sectional area coextensive with its top surface whereby to provide a second gas passageway extending beneath said shelf and around said block, said innermost casing having a restricted outlet opening in its bottom portion providing communication between said passageways, a hood supported in position overhanging the open top end of the inner casing and with its sides in spaced relation to the side walls of the inner casing whereby to provide a third gas passageway therebetween communicating with the second passageway at the top end of the inner casing, said hood having an outwardly flared skirt portion vertically adjustably mounted thereon in spaced overhanging relationship to the first passageway.

4. Refrigerating apparatus comprising heat transfer walls forming a closed outer casing having a relatively larger top end portion providing a gas chamber and presenting an outlet opening, an open topped inner casing nested in and in spaced relation to said walls whereby to form a gas passageway between the lower portions of said walls and the inner casing which passageway opens at its top end into said chamber, said inner casing extending at its top end portion into said chamber and being adapted to contain solidified $CO_2$ and carrying in its bottom portion a horizontal shelf of smaller area than the cross-sectional area of said inner casing and spaced from the bottom wall of said inner casing, said shelf being adapted to support a block of solidified $CO_2$ of a cross-sectional area coextensive with its top surface whereby to provide a second gas passageway extending beneath said shelf and around said block, means providing restricted communication between said passageways at the bottom portion of the inner casing, and a hood supported in spaced relation to the side walls and open top end of the inner casing whereby to provide a third gas passageway therebetween communicating at its discharge end with the primary passageway, the lower end of said hood terminating in spaced relationship to and overhanging only a portion of the width of the first-mentioned passageway, whereby gas released by the solidified $CO_2$ passes first downwardly along the primary passageway, thence upwardly along the first-mentioned passageway and a portion of it will there enter the third passageway and pass into the primary passageway for recirculation, while the remaining portion will enter the chamber and thence be released through the outlet opening.

5. Refrigerating apparatus comprising heat transfer walls forming a closed outer casing having a relatively larger top end portion providing a gas chamber and presenting an outlet opening, an open topped inner casing nested in and in spaced relation to said walls whereby to form a gas passageway between the lower portions of said walls and the inner casing which passageway opens at its top end into said chamber, said inner casing extending at its top end portion into said chamber and being adapted to contain solidified $CO_2$ and carrying in its bottom portion a horizontal shelf of smaller area than the cross-sectional area of said inner casing and spaced from the bottom wall of said inner casing, said shelf being adapted to support a block of solidified $CO_2$ of a cross-sectional area coextensive with its top surface whereby to provide a second gas passageway extending beneath said shelf and around said block, means providing restricted communication between said passageways at the bottom portion of the inner casing, and a hood supported in spaced relation to the side walls and open top end of the inner casing whereby to provide a third gas passageway therebetween communicating at its discharge end with the primary passageway, said hood having a skirt vertically adjustably mounted thereon, said skirt terminating in spaced relationship to and overhanging only a portion of the width of the first-mentioned passageway, whereby gas released by the solidified $CO_2$ passes first downwardly along the primary passageway, thence upwardly along the first-mentioned passageway and a portion of it will there enter the third passageway and pass into the primary passageway for recirculation, while the remaining portion will enter the chamber and thence be released through the outlet opening.

6. Refrigerating apparatus comprising an outer casing, an open topped Dry Ice container nested in the outer casing with its walls in spaced relation thereto whereby to provide a passageway therebetween, an open bottomed hood supported in position overhanging the open top end of the container with its walls in spaced relation to the walls of the container whereby to provide another passageway therebetween, and a restricted outlet in the outer casing, the upper portion of the casing surrounding said hood being of larger cross-sectional area than the lower portion of the casing.

7. Refrigerating apparatus comprising an outer casing, an open topped Dry Ice container nested in the outer casing with its walls in spaced relation thereto whereby to provide a passageway therebetween, an open bottomed hood supported in position overhanging the open top end of the container with its walls in spaced relation to the walls of the container whereby to provide another passageway therebetween, said hood having a closed top and having a vertically adjustable skirt portion defining its open bottom end, and a restricted outlet in the outer casing.

ALFRED G. BROWN.

REFERENCES CITED

The following references are of record in the file of this patent:

UNITED STATES PATENTS

| Number | Name | Date |
|---|---|---|
| 1,895,971 | Carpenter | Jan. 31, 1933 |
| 1,903,171 | Cordrey | Mar. 28, 1933 |
| 1,917,866 | Wood | July 11, 1933 |
| 2,263,522 | Scott | Nov. 18, 1941 |

FOREIGN PATENTS

| Number | Country | Date |
|---|---|---|
| 434,682 | Great Britain | Sept. 6, 1935 |
| 552,672 | Germany | June 16, 1932 |
| 673,605 | France | Jan. 17, 1930 |